No. 811,812.
PATENTED FEB. 6, 1906.
E. V. ANDERSON.
STAND PIPE FOR RAILWAYS.
APPLICATION FILED JAN. 16, 1904.
3 SHEETS—SHEET 1.
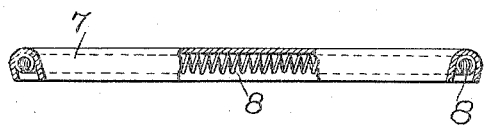
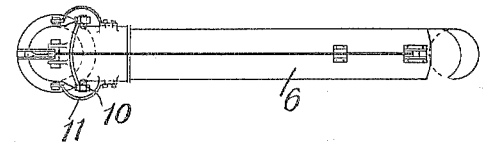
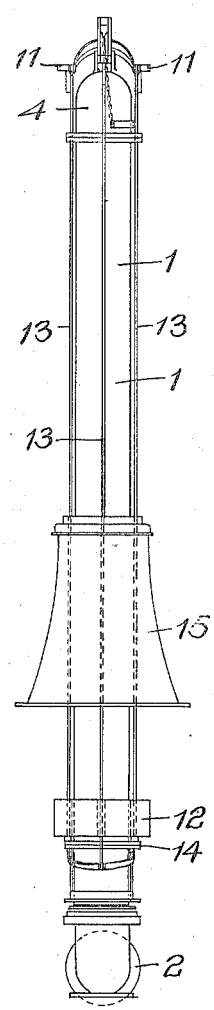
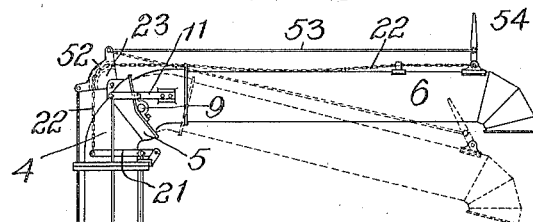
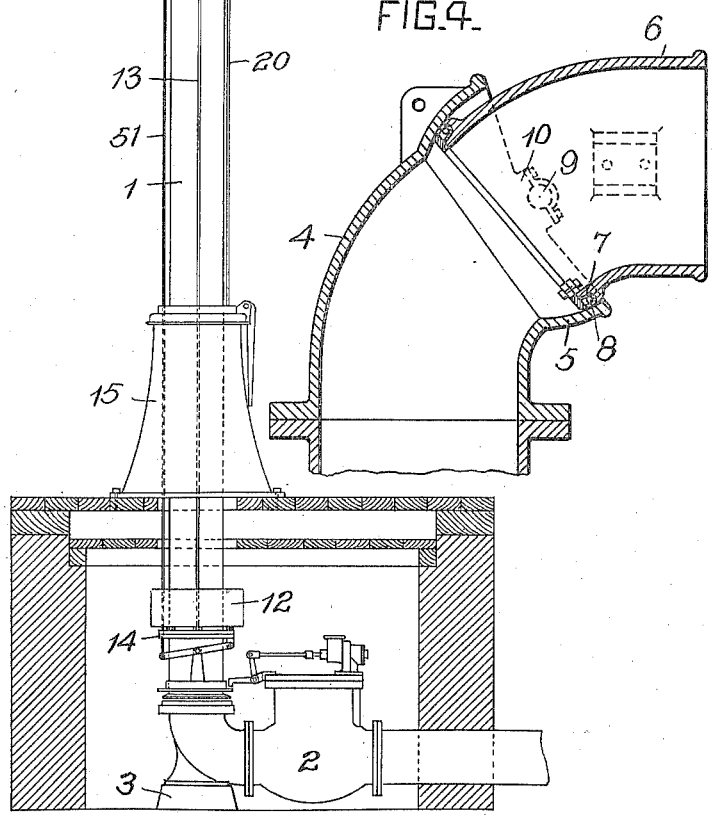
WITNESSES
Fred H. Kirchner
Herbert Bradley
INVENTOR
Edward V. Anderson
by Christy & Christy
ATTY'S.

No. 811,812. PATENTED FEB. 6, 1906.
E. V. ANDERSON.
STAND PIPE FOR RAILWAYS.
APPLICATION FILED JAN. 16, 1904.
3 SHEETS—SHEET 2.
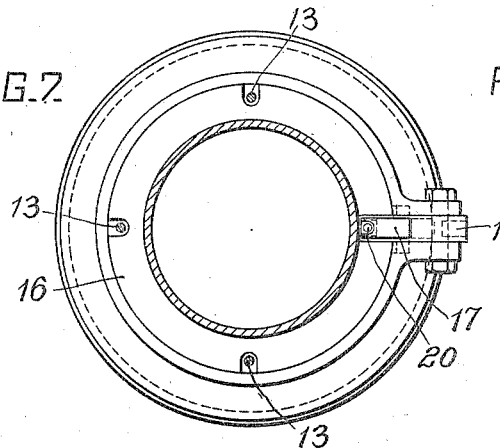
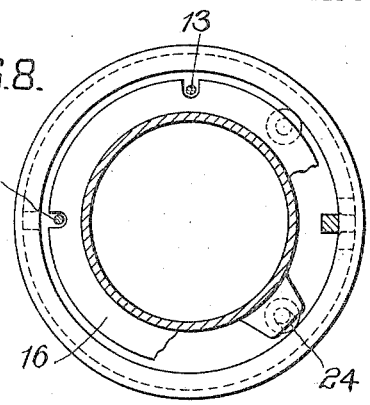
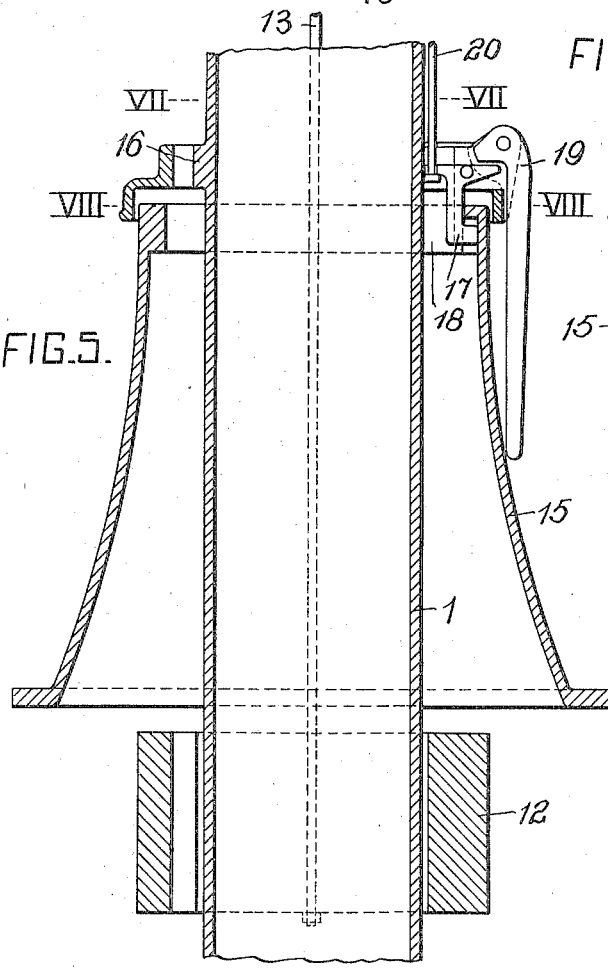
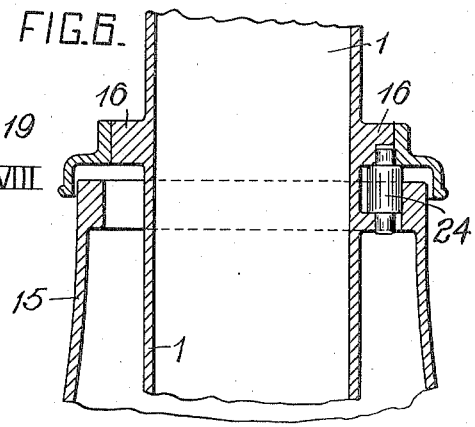
WITNESSES
Fred Kirchner.
Herbert Bradley.
INVENTOR
Edward V. Anderson
by Christy & Christy
ATTYS.

No. 811,812. PATENTED FEB. 6, 1906.
E. V. ANDERSON.
STAND PIPE FOR RAILWAYS.
APPLICATION FILED JAN. 16, 1904.

3 SHEETS—SHEET 3.

WITNESSES
Fred H. Kirchner
Herbert Bradley

INVENTOR
Edward V. Anderson
by Christy & Christy
ATTY'S.

UNITED STATES PATENT OFFICE.

EDWARD V. ANDERSON, OF PITTSBURG, PENNSYLVANIA.

STAND-PIPE FOR RAILWAYS.

No. 811,812.  Specification of Letters Patent.  Patented Feb. 6, 1906.

Application filed January 16, 1904. Serial No. 189,342.

*To all whom it may concern:*

Be it known that I, EDWARD V. ANDERSON, a citizen of the United States, residing at Pittsburg, in the county of Allegheny and State of Pennsylvania, have invented or discovered certain new and useful Improvements in Stand-Pipes for Railways, of which improvement the following is a specification.

The invention described herein relates to certain improvements in valve mechanism controlling the flow of water to stand-pipes, and has for its object a construction whereby the opening and closing of the valve is effected by the pressure of the water-supply.

Figure 9:
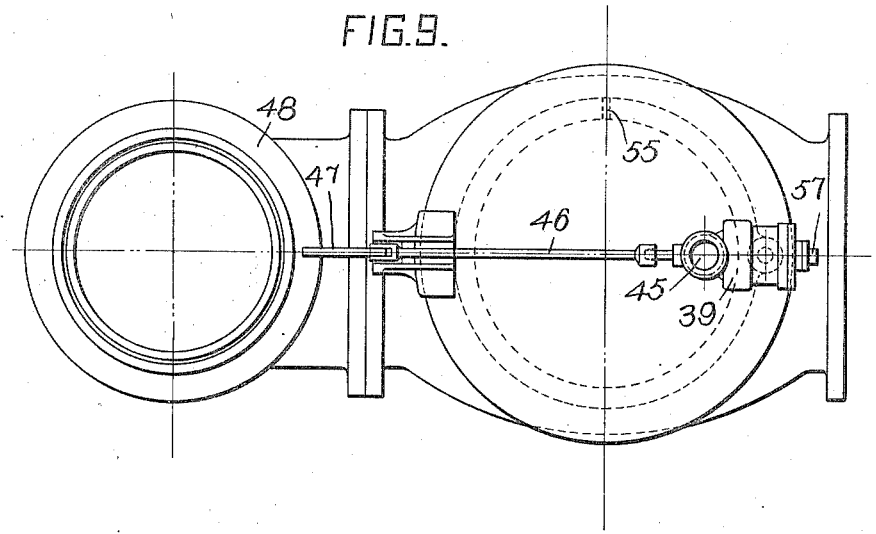
Figure 10:
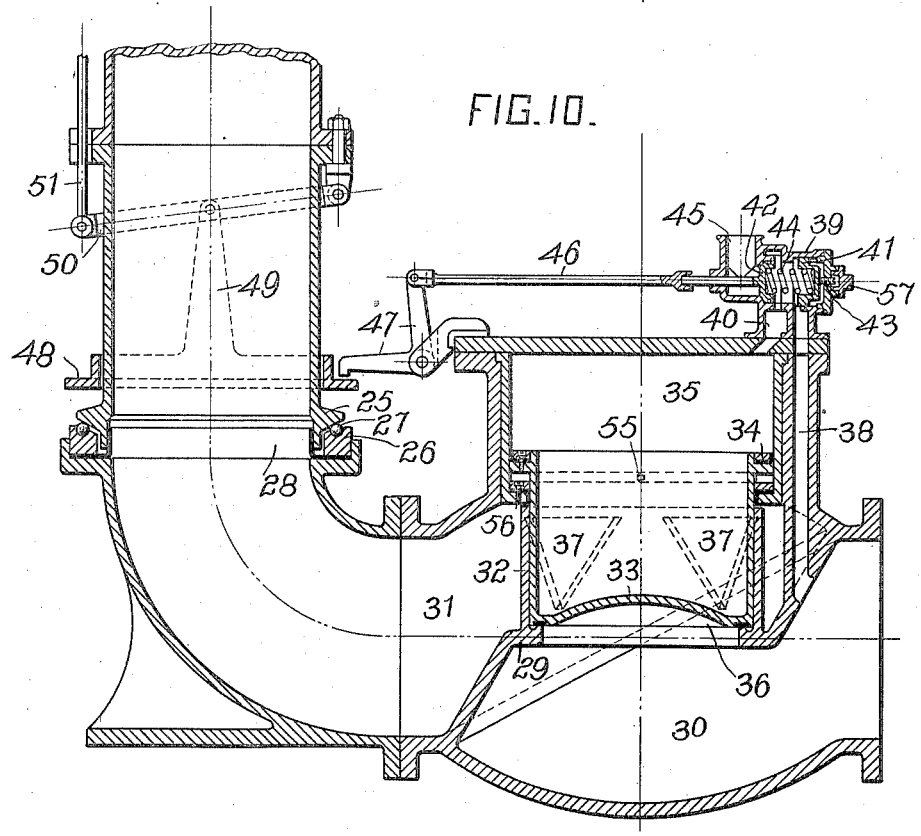

In the accompanying drawings, forming a part of this specification, Figure 1 is a side elevation of a stand-pipe embodying my improvements. Fig. 2 is an end elevation of the same. Fig. 3 is a plan view. Fig. 4 is a sectional detail view showing the joint between the vertical portion and the horizontal arm. Fig. 5 is a sectional view, on an enlarged scale, of a portion of the stand-pipe. Fig. 6 is a view similar to Fig. 5 on a different plane. Figs. 7 and 8 are sectional plan views on planes indicated, respectively, by lines VII VII and VIII VIII, Fig. 5. Fig. 9 is a plan view of the lower end or valve portion of the stand-pipe. Fig. 10 is a sectional elevation of the same, and Fig. 11 is a detail view of the packing between the vertical portion and the horizontal arm.

As is customary, the vertical portion 1 of the stand-pipe is secured at its lower end by an elbow to the valve-casing 2 and is supported by a suitable foundation-block 3. To the upper end of the vertical pipe 1 is secured an elbow 4 by a flange connection, said elbow being provided with a bell-shaped portion 5, having its interior surface spherical and preferably finished. The inner end of the horizontal portion projects within the spherical bell 5 and is suitably shaped, so as to be capable of motion therein. In order to form a tight joint between the end of the arm 6 and the bell, any suitable packing may be used, but preferably a cup-shaped packing 7, inserted within a suitable seat in the end of the arm and having its outer wall expanded or held in tight contact with the surface of the bell by a coil-spring 8. The arm 6 and the bell are held together by a pivotal connection, preferably formed by a trunnion 9 on the arm fitting within bearings 10 on the bell. It will be observed that the inner surface of the semispherical bell 5 coincides with an arc of a circle, the center of which is at the intersection of the axes of the trunnions 9 and the horizontal arm 6. By this construction no strain whatsoever is brought upon the packing between the arm and the bell, the weight of the arm being carried by the bearings 10, while the arm is free to be shifted vertically, as desired. In order to counterbalance the arm, lugs 11 are secured thereto and extend to the rear of the trunnions and have a weight 12 connected thereto by rods 13, which extend down alongside the pipe 1 and are connected at the lower ends to a weight 13. This weight by preference will rest upon a suitable stop or support, as a flange-coupling 14, when the arm 6 is in horizontal or normal position.

The pipe 1 is held in vertical position by a stand or frame 15, secured to the platform, as shown, and the pipe is provided with a flange 16, having downwardly-turned lips extending a short distance below the upper end of the stand. To the flange 16 is pivotally connected a dog 17, so hung or supported that in normal position its lower end will swing out to engage lugs 18 on the inner wall of the stand. This dog can be shifted so as to pass out of engagement with the lugs by means of a lever 19, which when turned to a horizontal position will bear upon a portion of the dog and swing its lower end inwardly, thereby unlocking the pipe 1 from the stand 15. This handle when thus turned to horizontal position will also serve as a means for rotating the pipe. In order to provide for the shifting of the dog from the tender of the locomotive, a rod 20 is connected to a lateral extension of the dog and extends up alongside of the pipe to a lever 21. The free end of this lever is connected to a chain 22, which passing over a segmental sheave-block 23 extends to the front end of the arm 6, where it can be caught and pulled by the operator. It will be readily understood that the arm 6 will always tend to cause the vertical portion of the pipe to swing from vertical position and to bear more heavily against one part of the stand than another. In order to avoid frictional resistance due to such increased bearing, friction-rollers 24 are mounted on the stand-pipe on the same side as the arm 6 and bear against the inner wall of the upper end of the stand. To facilitate the rotation of the vertical pipe, its lower end has an anti-friction-bearing upon the elbow connecting it with the valve-case 2, the bearing being formed by a rib 25 in the pipe or vertical portion, said rib having its under or bearing surface curved transversely and a ring 26 on the elbow, balls 27 being interposed between said parts. This construction forms a ball-and-socket connection between the vertical pipe and its support, permitting the latter to move from true vertical position without injury to the joint between said parts. In order to prevent the escape of water through this joint, a packing-ring 28 is secured to the elbow, and its free portion extends upwardly into the vertical pipe.

The valve-casing 2 is divided by a diaphragm 29 into two parts or chambers 30 and 31, the former being connected to the supply-pipe and the latter to the vertical pipe. On this diaphragm 29 is formed an open-ended cylinder 32 for the reception of the lower end of the piston-valve 33. This piston-valve is preferably made hollow and is provided at its upper end with a flange 34, said flange operating within a cylinder 35, forming part of the valve-casing. This flange is provided with a suitable packing to prevent the flow of water from cylinder 35 into the stand-pipe. When in its lower position, the end of the valve-piston bears against a rim 36 at the lower end of the cylinder 32, forming a tight joint therewith, as against escape of fluid. When the piston is raised, it uncovers V-shaped ports 37, formed through the wall of the cylinder 32 on the diaphragm. As the apices of these ports are down, there will be a gradual increase in flow of water from one side of the diaphragm to the other, and also a gradual cutting-off when the cylinder is forced down to its seat 36. A port 38 extends from the inlet-chamber 30 of the valve up to a valve-chamber 39, which is also connected by port 40 with the upper end of the cylinder 35. Within this chamber 39 is arranged an adjustable valve 41 and a shiftable valve 42. The adjustable valve 41 is arranged to control the passage 38 and can be adjusted back and forth by means of a screw 43 and a spring 44, interposed between valves 41 and 42. Valve 42 controls the flow of water from the valve-chamber to the cylinder 35. By shifting the valve 42 to the right the port 40 will be placed in communication with an outlet-exhaust port 45, and the upper side of the piston-valve 33 will be relieved from pressure, so that the pressure of the water on the under side of such valve will force it up and allow water to flow through the V-shaped ports 37 into the stand-pipe. When the valve 42 is shifted to the left, the escape of water from the cylinder is stopped and the flow of water from the chamber 30 or the supply side of the valve mechanism to the upper side of the piston-valve 33 will be permitted, thereby causing the piston-valve to move downwardly, as the area at the upper end of the piston-valve is greater than that at the lower end. By adjusting the valve 41 by the screw 43, so as to change the capacity of the port from the supply side, the rate of closure of the piston-valve can be regulated. The valve 42 is provided with a stem 46, connected to one arm of a bell-crank lever 47, whose opposite arm projects into the path of movement of a ring 48, surrounding the vertical pipe. This ring is connected by an arm 49 to a lever 50 and the latter by a rod 51, bell-crank lever 52, and rod 53 to an operating-handle 54 on the horizontal arm 6 of the stand-pipe.

It will be observed that the cylinders 32 and 35 are practically one cylinder, having one portion of greater diameter than the other, and that the piston-valve 33 is differential in construction. A cushion for the closing movement is provided by forming a constantly-open port 55 adjacent to the shoulder 56 between the cylinders 32 and 35. The escape of water from this port will show that either the packing on the flange 34 is defective or that the piston-valve 33 does not seat properly on the rim 36. The adjusting-screw 43, which extends out from the valve-chamber 39 is preferably protected by a screw-cap 57.

I claim herein as my invention—

1. In a valve mechanism the combination with a casing provided with a valve-seat in its interior, of a hollow cylinder within said casing surrounding said valve-seat at one end and open at its opposite end and having openings at its side for the flow of liquid when the valve is open, a cylindrical valve substantially fitting the interior of the cylinder and covering the outlet-ports when in closed position and having one end closed and adapted to seat against said valve-seat, and means for operating said valve.

2. In a valve mechanism the combination with a casing provided with a valve-seat in its interior, of a hollow cylinder within said casing surrounding said valve-seat at one end and open at its opposite end and having openings at its side for the flow of liquid when the valve is open, a cylindrical valve substantially fitting the interior of the cylinder and covering the outlet-ports when in closed position and having one end closed and adapted to seat against said valve-seat, an operating-cylinder in axial alinement with the first-named cylinder, a piston therein connected to said valve and means for admitting fluid under pressure to the operating-cylinder on the side of the piston opposite said valve and for permitting the escape of said fluid.

3. In a valve mechanism the combination with a casing provided with an internal valve-seat and embodying in its construction two internal hollow cylinders differing in diameter and having a common axis, one end of the smaller cylinder surrounding the valve-seat and its opposite end communicating with the larger cylinder, the smaller cylinder having outlet for the flow of liquid when the valve is open, a combined valve and piston having its valve portion when closed, substantially fitting the smaller cylinder throughout the length thereof and guided thereby and having the end opposite the piston portion constructed to seat on the valve-seat, the piston portion fitting the larger cylinder a passage connecting the larger cylinder with a source of supply and with a waste-passage and a valve for alternately closing said passages.

In testimony whereof I have hereunto set my hand.

EDWARD V. ANDERSON.

Witnesses:
F. E. GAITHER,
DARWIN S. WOLCOTT.